March 31, 1953 J. A. FOWLE 2,633,351
SCALE FOR FISH LANDING NETS
Filed June 20, 1951
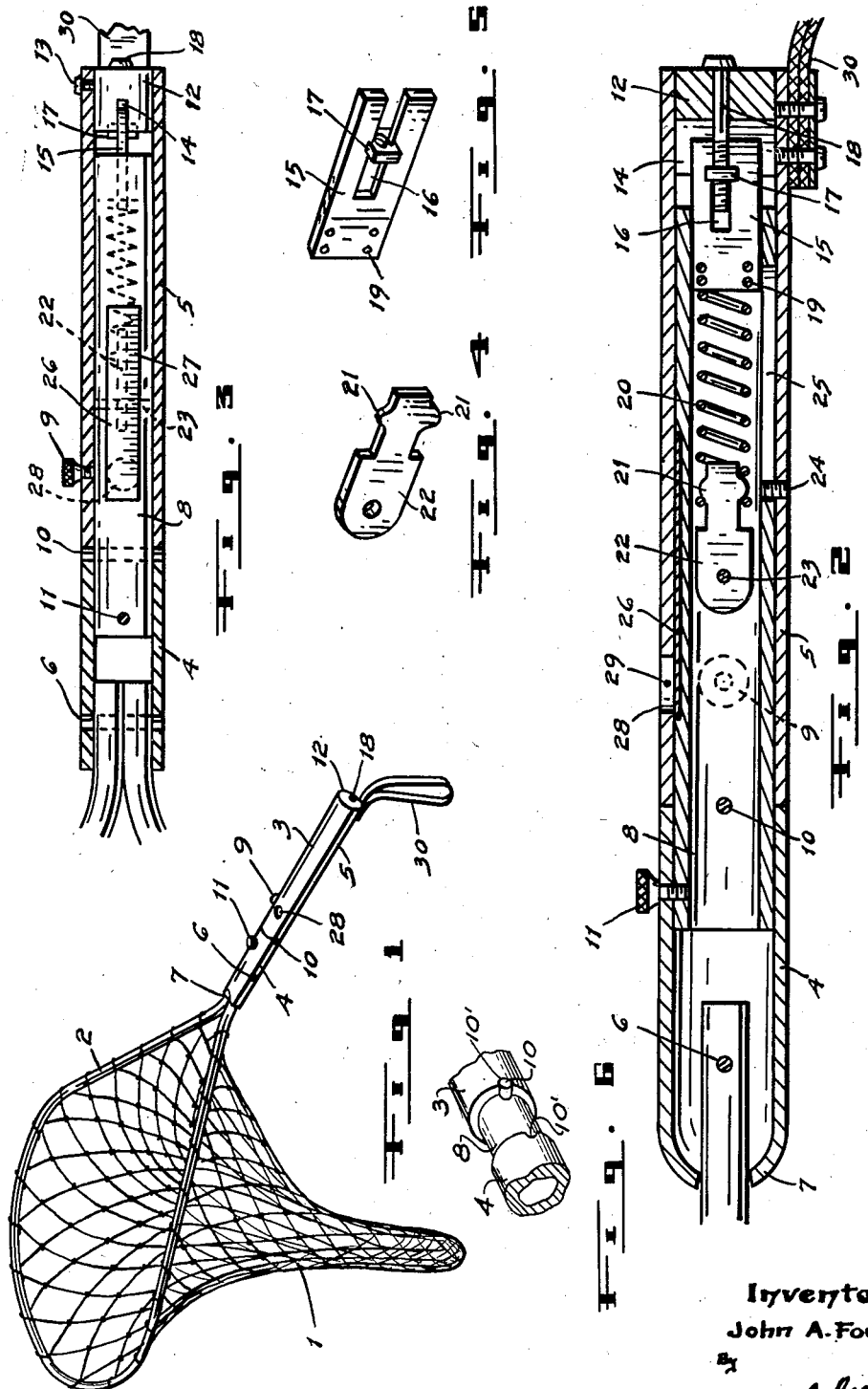
Inventor
John A. Fowle
By
Walter C. Boggs
AGENT Patented Mar. 31, 1953

2,633,351

UNITED STATES PATENT OFFICE 2,633,351

SCALE FOR FISH LANDING NETS

John Alfred Fowle, Winnipeg, Manitoba, Canada

Application June 20, 1951, Serial No. 232,575

3 Claims. (Cl. 265—66)

The invention relates to a scale in combination with a landing net for netting fish, and the principal object of the invention is to provide a handle for a landing net wherein said handle will form a scale for weighing the fish caught in said net.

A further object of the invention is to construct the handle of the net in a knock-down construction so that it can be disassembled when not in use and be compactly stored.

A further object of the invention is to form the handle so that, when in use, the various parts thereof will be rigid when netting fish and operably aligned and prevented from rotation in respect to the net when used as a scale.

A further object of the invention is to construct the device so that all parts can be quickly taken apart for repairs or replacements.

A still further object of the invention is to provide means for adjusting the spring tension to bring the scale into a neutral position when the net is empty and the reading is not correct at the zero point.

With the above important and other minor objects in view, which will become more apparent as the description proceeds, the invention consists essentially in the construction and arrangement of the various parts hereinafter more particularly described, reference being had to the accompanying drawings in which:

Figure 1 is a perspective view of a fish landing net with the scale handle attached thereto.

Figure 2 is an enlarged vertical sectional view centrally through the handle.

Figure 3 is an enlarged horizontal sectional view through the handle and showing the plunger and end plug in elevation.

Figure 4 is a perspective view of the plunger plate for holding one end of the scale spring.

Figure 5 is a perspective view of the adjustment plate for holding the opposite end of the spring.

Figure 6 is a partial perspective view showing the sleeve separated from the cylinder to expose the cut-outs.

In the drawings like characters of reference indicate corresponding parts in the several figures.

A fish landing net 1 is generally indicated in Figure 1. The open end of this net is secured to an open racket frame 2 by the cords of the net being looped thereover. The two ends of the racket frame are brought together in parallel relation and are received in one end of a handle 3 which forms the present invention.

The handle 3 is formed from two pieces of tubing 4 and 5, the tubing 4 hereinafter being called the sleeve and the tubing 5 hereinafter being called the cylinder. One end of the sleeve 4 receives the ends of the racket frame and a pin 6 passes through the sleeve and said ends to firmly secure them together. The said end of the sleeve is also pressed around the racket frame ends, as shown at 7.

The cylinder 5 receives a tubular plunger 8 which is endwise slidable therein. This plunger is normally locked to the cylinder, in the position shown in Figures 2 and 3, by a finger control screw 9 which screws through the cylinder wall and presses against the plunger. When in this position, one end of the plunger projects from the cylinder to receive and align the sleeve 4 thereon. When the sleeve is fully pressed against the cylinder, a hole is drilled across and through the plunger, at the junction, so that a pin 10 can be inserted through the plunger and act as a dowel for the half-circle cut-outs 10' in the ends of the sleeve and cylinder created by the drill. To hold the sleeve firmly against the cylinder and dowel pin, a further finger control screw 11 passes through a hole in the sleeve and screws into the plunger 8. Accordingly, when the finger screws are tight, the three parts are a unit and form a firm handle for operation of the net.

The free end of the cylinder 5 is closed by a plug 12 which is held in flush position by a set screw 13. The inner end of the plug is slotted at 14 to receive one end of an adjustment plate 15. The received end of the adjustment plate is slotted at 16 and this slot receives and firmly holds a cross-positioned nut 17 approximately at the centre of the slot. An adjustment bolt 18 passes through the centre of the plug 12 and screws into the nut 17 so that by turning this bolt the adjustment plate can be endwise shifted in relation to the cylinder. The opposite end of the adjustment plate is provided with four holes 19, two at the top and two at the bottom thereof. A coil spring 20 has one end threaded through the holes 19 of the adjustment plate and the other end is screwed over a pair of humps 21 of a plunger plate 22 which is secured in and to the plunger 8 by a cross pin 23.

From the above construction it will be seen that, if the finger screw 9 is released, the sleeve 4 can be pulled away from the cylinder 5 and the plunger 8, sliding therein, will resiliently tension the spring 20. To prevent the sleeve turning in relation to the cylinder at this time, a screw 24 is screwed through the cylinder wall and is received in a lengthwise slot 25 in the plunger and acts as a slide pin therein. A suitable plate 26 is imbedded in the upper side of the plunger and the face thereof is calibrated for weight measurement, as indicated at 27. A hole 28 is provided in the cylinder wall opposite these calibrations and a hair wire 29 crosses this hole and registers with the calibrations in the movement of the plunger.

While I have shown a separate plate for the calibrations, it will be understood that the calibrations may be marked directly on the plunger wall, and while a hair wire is shown, the same result could be obtained by cutting the hole with impointing arrows on the edge thereof. The strap loop shown at 30, on the free end of the handle, is conveniently placed there so that the fisherman can hang it from his belt and the landing net will always be ready for use while freeing his hands for other fishing purposes.

When the device is used for netting fish, the various parts are as shown in the drawings and the handle is firmly connected with the net for the purpose. When a fish has been netted, the handle is then held vertically with the net and caught fish therebelow. The finger control screw 9 is then released and the weight of the fish will draw the sleeve 4 and plunger 8 down so that the calibrations thereon can be seen through the hole 28 and be visibly read in relation to the hair wire to give the correct weight of the netted fish. When the fish is removed from the net, the plunger and sleeve will return to the position shown in the drawings with the calibrations registering zero at the hair wire. The finger control screw will then be turned to lock the parts in position ready for netting another fish. If for any reason the calibrations do not register correctly at the zero point, a screw driver can be connected with the bolt 18 and turning same in the correct direction will quickly bring the calibrations into their proper position. To store the device, the finger screw 11 is removed from the handle and the sleeve and net can then be separated from the cylinder and plunger. The two parts can then be compactly stored in a suitable container, such as a canvas bag, until again required. If any of the interior parts break or require replacement, the finger screw 9 can be released and then by removing the screw 24 and unscrewing the bolt 18, all working parts of the scale can be withdrawn from the cylinder. To separate the remaining parts, the sleeve can be removed from the plunger by unscrewing the finger screw 11 while the plug 12 can be withdrawn by removing the screw 13. By knocking out the pin 23, the plunger plate 22 will fall out of the plunger.

From the above description it will be seen that I have invented a compact weighing handle for a fish landing net which does not interfere with the normal netting use. The operation of the device for its dual purpose merely consists in tightening or releasing the finger control screw 9 while the finger screw 11 is only used when assembling the device for use or disassembling for storage. All working parts are covered and protected. It forms a large, strong, sturdy and rigid handle for the net and the parts are maintained in alignment when used for weighing. The correction of the scale reading is simple and easily accomplished while all interior working parts can be released, repaired or replaced by a novice without requiring special tools and in a minimum of time. The parts can all be made from non-corrosive material so that it will be unaffected by either fresh or salt water and by generous use of aluminum can be made extremely light and not become a weight burden.

What I claim as my invention is:

1. A scale for a fish landing net, comprising: a net; a plunger having one end thereof secured to and supporting said net; a cylinder slidably receiving the opposite end of said plunger therein; spring means resiliently and interiorly connecting said plunger with the free end of said cylinder; manually operable means for varying the resiliency of said spring means; means for preventing rotation of said plunger in respect to said cylinder; releasable locking means between said cylinder and said plunger; weight calibrations on said plunger; and means carried by said cylinder and visibly registerable with said calibrations in the movement of said plunger in respect to said cylinder.

2. A scale for a fish landing net, comprising: a net; a handle formed by a sleeve and a normally abutting aligned cylinder; one end of said sleeve carrying said net; a plunger having one end releasably secured in the opposite end of said sleeve; the opposite end of said plunger slidably receivable in said cylinder; interior spring means resiliently connecting said plunger with said cylinder; means for varying the resilience of said spring means; means for preventing rotation of said sleeve in respect to said cylinder in the sliding movement of said plunger therein; releasable locking means between said cylinder and said plunger; calibrations on said plunger; and means on said cylinder visibly registerable with said calibrations in the movement of said plunger through said cylinder.

3. A removable scale handle for a fish landing net, comprising: a handle formed by a sleeve and a cylinder; a plunger releasably secured to, slidable in, and aligning both said sleeve and said cylinder; a net secured to the free end of said sleeve; a spring within and having one end thereof secured to said plunger and the other end connected to said cylinder to draw same against said sleeve when said cylinder is released from said plunger; screw means for varying the resiliency of said spring; pin and slot means between said cylinder and said plunger for preventing rotation of said members in respect to each other in their sliding movement therepast; weight graduations on said plunger; and means on said cylinder visibly registerable with said graduations in the movement of said plunger through said cylinder against the resilience of said spring.

JOHN ALFRED FOWLE.

REFERENCES CITED

The following references are of record in the file of this patent:

UNITED STATES PATENTS

| Number | Name | Date |
|---|---|---|
| 739,047 | Wilson | Sept. 15, 1903 |
| 916,251 | Arnold | Mar. 23, 1909 |
| 1,014,839 | Miller | Jan. 16, 1912 |
| 2,129,469 | Hedges | Sept. 6, 1938 |
| 2,147,917 | Noren | Feb. 21, 1939 |
| 2,446,720 | Rominski | Aug. 10, 1948 |